(12) United States Patent
Hagari

(10) Patent No.: US 6,708,678 B2
(45) Date of Patent: Mar. 23, 2004

(54) ELECTRONIC CONTROL DEVICE FOR INTERNAL COMBUSTION ENGINE AND METHOD OF CONTROLLING THE INTERNAL COMBUSTION ENGINE

(75) Inventor: Hideki Hagari, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 347 days.

(21) Appl. No.: 09/853,877

(22) Filed: May 14, 2001

(65) Prior Publication Data

US 2002/0046742 A1 Apr. 25, 2002

(30) Foreign Application Priority Data

Oct. 25, 2000 (JP) .................................... P. 2000-326014

(51) Int. Cl.[7] .................. F02M 25/07; F02D 41/04; F02P 5/15
(52) U.S. Cl. ................... 123/568.22; 123/698; 123/480
(58) Field of Search ........................ 123/568.22, 568.21, 123/568.23, 568.25, 698, 480

(56) References Cited

U.S. PATENT DOCUMENTS

| 4,881,509 A | 11/1989 | Ohashi et al. ............... 123/571 |
| 4,938,198 A | * 7/1990 | Suzuki ................... 123/568.27 |

FOREIGN PATENT DOCUMENTS

| JP | 61-8444 | 1/1986 | ........... F02D/43/00 |
| JP | 0A2000199454 A | * 7/2000 | |

* cited by examiner

Primary Examiner—Tony M. Argenbright
Assistant Examiner—Arnold Castro
(74) Attorney, Agent, or Firm—Sughrue Mion, PLLC

(57) ABSTRACT

The invention provides an electronic control device for an internal combustion engine and a control method thereof in which more stable control is attained on the internal combustion engine in association with change in EGR amount due to change in atmospheric pressure.

The electronic control device comprises a detector 21 for detect an operating condition of the internal combustion engine 1 from engine speed and intake pressure, a controller 24 for controlling the EGR amount on the basis of a result detected by the operating condition detector 21, a first fundamental control value calculator 26 for calculating a fundamental control value of the internal combustion engine 1 on the basis of the result detected by the operating condition detector 21 in a suspended state of the EGR, a second fundamental control value calculator 29 for calculating the fundamental control value of the internal combustion engine 1 on the basis of the result detected by the operating condition detector 21 in an operated state of the EGR, in which a change in EGR amount at the time of change in atmospheric pressure is calculated in the form of a rate of change to the EGR amount under the standard atmospheric pressure on the basis of the result detected by the operating condition detector and atmospheric pressure in the operated state of the EGR, and a fundamental control value calculated by the second fundamental control value calculator is corrected on the rate of change in the EGR amount.

6 Claims, 4 Drawing Sheets

ELECTRONIC CONTROL DEVICE FOR INTERNAL COMBUSTION ENGINE AND METHOD OF CONTROLLING THE INTERNAL COMBUSTION ENGINE

BACKGROUND OF THE INVENTION

1. Technical Field

The present invention relates to an electronic control device for us in internal combustion engine for correcting control variables such as amount of fuel to be supplied or ignition timing of the internal combustion engine for vehicles in compliance with change in atmospheric pressure under a state of operating an exhaust gas recirculating apparatus.

2. Background Art

In the internal combustion engine for vehicles provided with exhaust gas recirculating (hereinafter simply referred to as EGR) apparatus, several control devices have been heretofore proposed for operating the internal combustion engine at a predetermined air/fuel ratio without being influenced by any change in atmospheric pressure. Control devices for changing control contents in compliance with change in atmospheric pressure to cope with the change in atmospheric pressure during running on a place of high altitude, etc. have been also provided. For example, the Japanese Patent Publication (examined) No. 89682/1994 discloses one of such control devices. In the prior art disclosed in this publication, a recirculation passage of EGR apparatus is subject to opening and closing. A first correction with respect to fundamental amount of fuel to be supplied is made on the basis of a difference in pressure between atmospheric pressure and intake pressure as well as an engine speed of the internal combustion engine under the state of opening the recirculation passage. In this first correction, amount of fuel to be supplied is increased in proportion to the difference in pressure. In case that atmospheric pressure becomes low irrespective of opening or closing the recirculation passage, second correction is made to increase the amount of fuel to be supplied. Thus, an object of this known art is to operate the internal combustion engine at all times at a predetermined air-fuel ratio in compliance with the change in atmospheric pressure.

Other than the foregoing prior art, the Japanese Patent Publication (examined) No. 2569586 proposed a further prior art. In this prior art, a first fundamental control value is calculated on the basis of intake pressure and engine speed of an internal combustion engine under the state of suspending operation of the EGR. A second fundamental control value under the state of operating the EGR is calculated on the basis of the first fundamental control value and a correcting value obtained from the intake pressure and the engine speed. The first and second fundamental control values are corrected by the correcting value obtained from another parameter of the internal combustion engine. Furthermore, in the calculation of the mentioned correcting value obtained from the intake pressure and the engine speed, the intake pressure is corrected by atmospheric pressure so that fuel system and ignition system are controlled by the calculated control value.

In case that amount of fuel injection, ignition timing and EGR valve opening in the internal combustion engine provided with the EGR apparatus are controlled merely by intake pipe pressure and engine speed of the internal combustion engine, atmospheric pressure changes when the running is shifted from a place of low altitude to that of high altitude. Back pressure also changes following the change in atmospheric pressure. Accordingly, even if valve opening of the EGR remains unchanged in the same intake pipe pressures and engine speed of the internal combustion engine, amount of introduction into the EGR changes. As a result, inconsistency occurs in the control of amount of fuel injection and ignition timing. That is, an air-fuel ratio to be controlled changes in case that amount of introduction into the EGR changes due to change in atmospheric pressure. Thus, there arises deterioration in exhaust emission and in drivability, and moreover knocking occurs due to deviation in required ignition timing.

In the mentioned prior arts, the Japanese Patent Publication (examined) No. 89682/1994 relates to the manner of controlling air-fuel ratio in conformity of change in atmospheric pressure. The Japanese Patent Publication (examined) No. 2569586 relates to the manner of changing control contents in the internal combustion engines in compliance with the change in atmospheric pressure. In both prior arts, intake pressure is corrected depending upon the atmospheric pressure, and the internal combustion engine is controlled according to the correcting value calculated from the corrected intake pressure and engine speed of the internal combustion engine. As a result, it cannot be always said that appropriate correction is made with respect to the internal combustion engine.

SUMMARY OF THE INVENTION

The present invention was made to solve the above-discussed problems and has an object of providing an electronic control device for internal combustion engine capable of controlling the internal combustion engine more stably in association with change in amount of EGR due to change in atmospheric pressure. The invention also provides a control method of internal combustion engine.

To accomplish the foregoing object, an electronic control device for an internal combustion engine according to the invention comprises:

atmospheric pressure detector means for detecting an atmospheric pressure;

operating condition detector means for detecting an operating condition of the internal combustion engine from engine speed and intake pressure of the internal combustion engine;

exhaust gas recirculation amount control means for controlling a recirculation amount of exhaust gas on the basis of a result detected by the mentioned operating condition detector means;

first fundamental control value calculating means for calculating a fundamental control value of the internal combustion engine on the basis of the result detected by the operating condition detector means in the suspended state of exhaust gas recirculation;

second fundamental control value calculating means for calculating a fundamental control value of the internal combustion engine on the basis of the result detected by the operating condition detector means in the operated state of exhaust gas recirculation;

control value calculating means for correcting a result calculated by the first fundamental control value calculating means or a result calculated by the second fundamental control value calculating means on the basis of a physical value representing a state of the internal combustion engine;

exhaust gas recirculation change calculating means for calculating a change in recirculation amount of exhaust gas at the time of change in atmospheric pressure in the form of a rate of change to the recirculation amount of exhaust gas under the standard atmospheric pressure on the basis of the result detected by the operating condition detector means and the result detected by the atmospheric pressure detector means in the operated state of exhaust gas recirculation; and correction means for correcting the fundamental control value calculated by the second fundamental control value calculating means on the basis of the rate of change to the recirculation amount of exhaust gas calculated by the exhaust gas recirculation change value calculating means.

As a result of such construction, each control value of the internal combustion engine can comply with an actually required control value in case that atmospheric pressure changes at the time of implementing the control of the exhaust gas recirculation. Thus, an advantageous electronic control device for the internal combustion engine can be obtained.

In the electronic control device according to claim 2 of the invention, the fundamental control value is an amount of fuel injection of a fuel injection device.

As a result, the amount of fuel injection can comply with an actually required control value.

In the electronic control device according to claim 3 of the invention, the fundamental control value is a control value for ignition timing.

As a result, the ignition timing can comply with an actually required control value.

In the electronic control device according to claim 4 of the invention, the ratio of change of the recirculation amount of exhaust gas is calculated by the exhaust gas recirculation change calculating means as a function of atmospheric pressure and intake pressure.

As a result, the control values can precisely comply with an actually required control value of the internal combustion engine.

A method for controlling the internal combustion engine according to the invention in which an operating condition of an internal combustion engine is detected on the basis of engine speed of the internal combustion engine and intake pressure, a recirculation amount of exhaust gas is controlled on the basis of the detected result thereof, and a fundamental control value of the internal combustion engine is corrected in compliance with the mentioned operating condition;

the method comprising:
a step of calculating the fundamental control value of the mentioned internal combustion engine in compliance with the operating condition in the operated state of exhaust gas recirculation;
a step of calculating a change in recirculation amount of exhaust gas at the time of change in atmospheric pressure in the form of a rate of change thereof to the recirculation amount of exhaust gas under the standard atmospheric pressure in the operated state of exhaust gas recirculation; and
a step of correcting the mentioned fundamental control value on the basis of the mentioned rate of change.

As a result, it becomes possible to obtain an advantageous electronic control method for the internal combustion engine in which each control value of the internal combustion engine can comply with actually required control value in case that atmospheric pressure changes at the time of implementing the control of the exhaust gas recirculation.

In the mentioned step of calculating the fundamental control value, amount of fuel injection through a fuel injection device or an adjusting value of ignition timing is calculated as the fundamental control value.

As a result, it becomes possible to obtain the amount of fuel injection or of the ignition timing in compliance with the actually required value.

DESCRIPTION OF THE PREFERRED EMBODIMENTS

Embodiment 1

Figure 1:
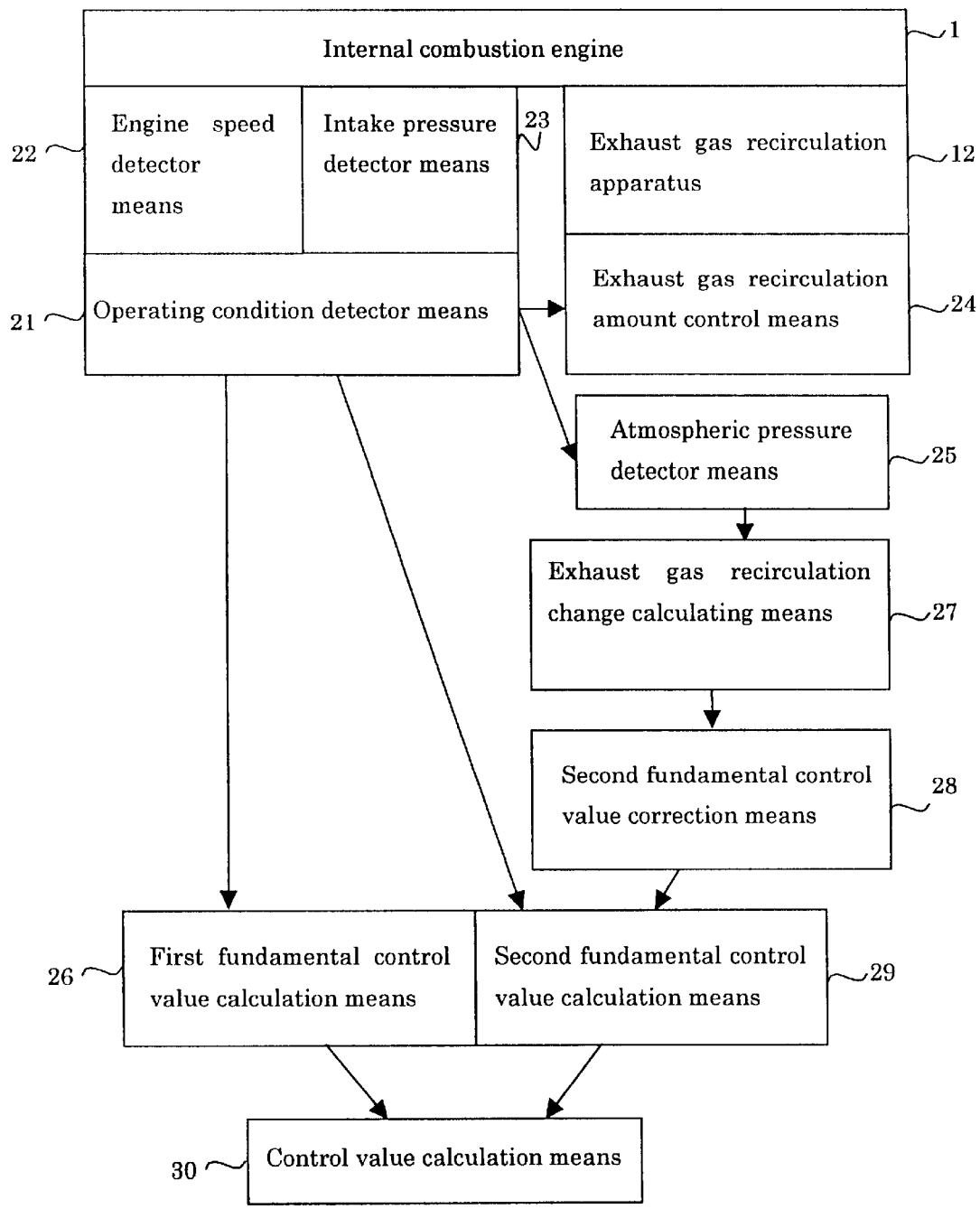
FIG. 1 is a block diagram showing functions of control means in an electronic control device of an internal combustion engine according to Embodiment 1 of the present invention.
Figure 2:
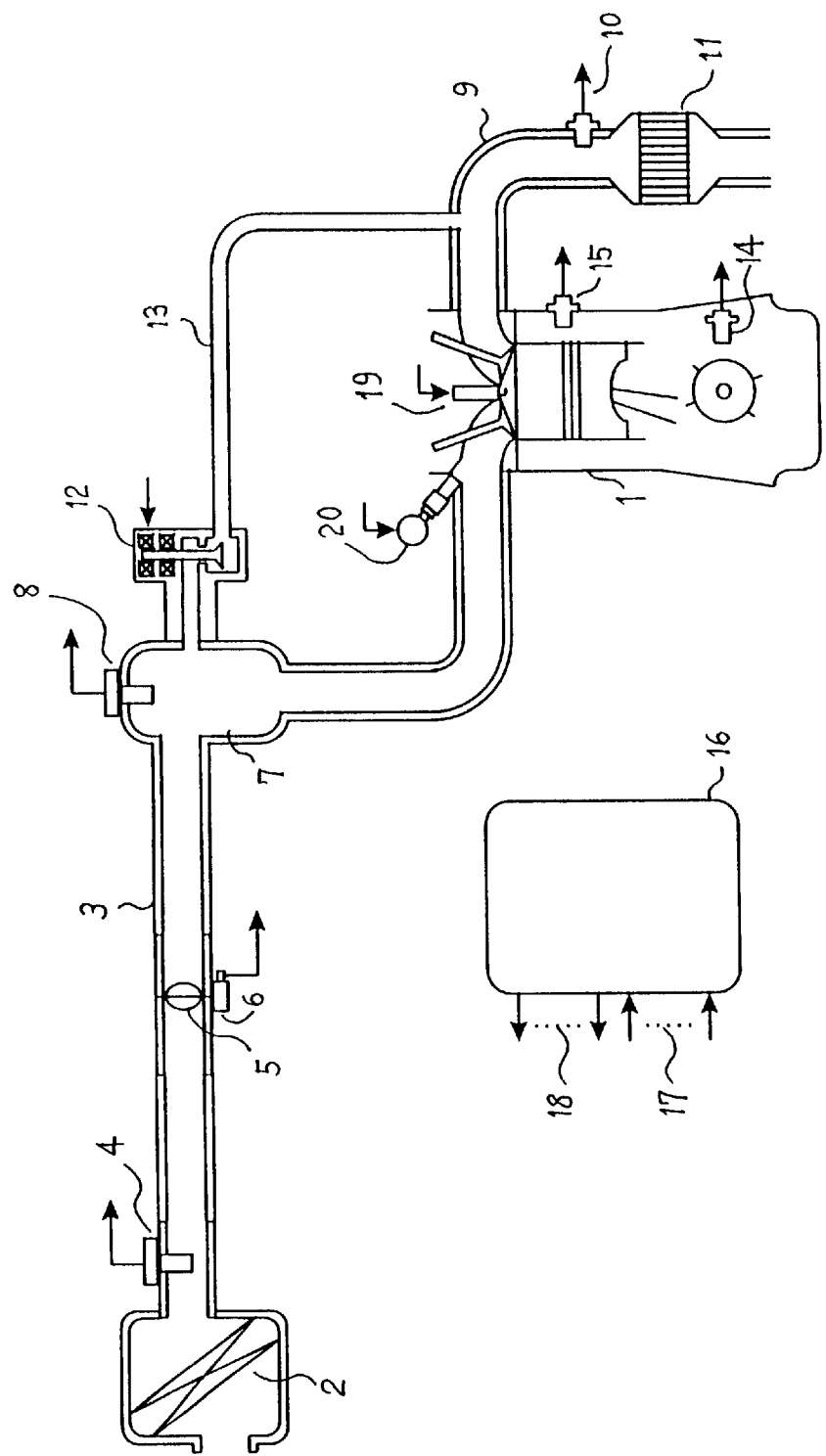
FIG. 2 is a schematic view of the electronic control device of the internal combustion engine according to Embodiment 1 the invention.
Figure 3:
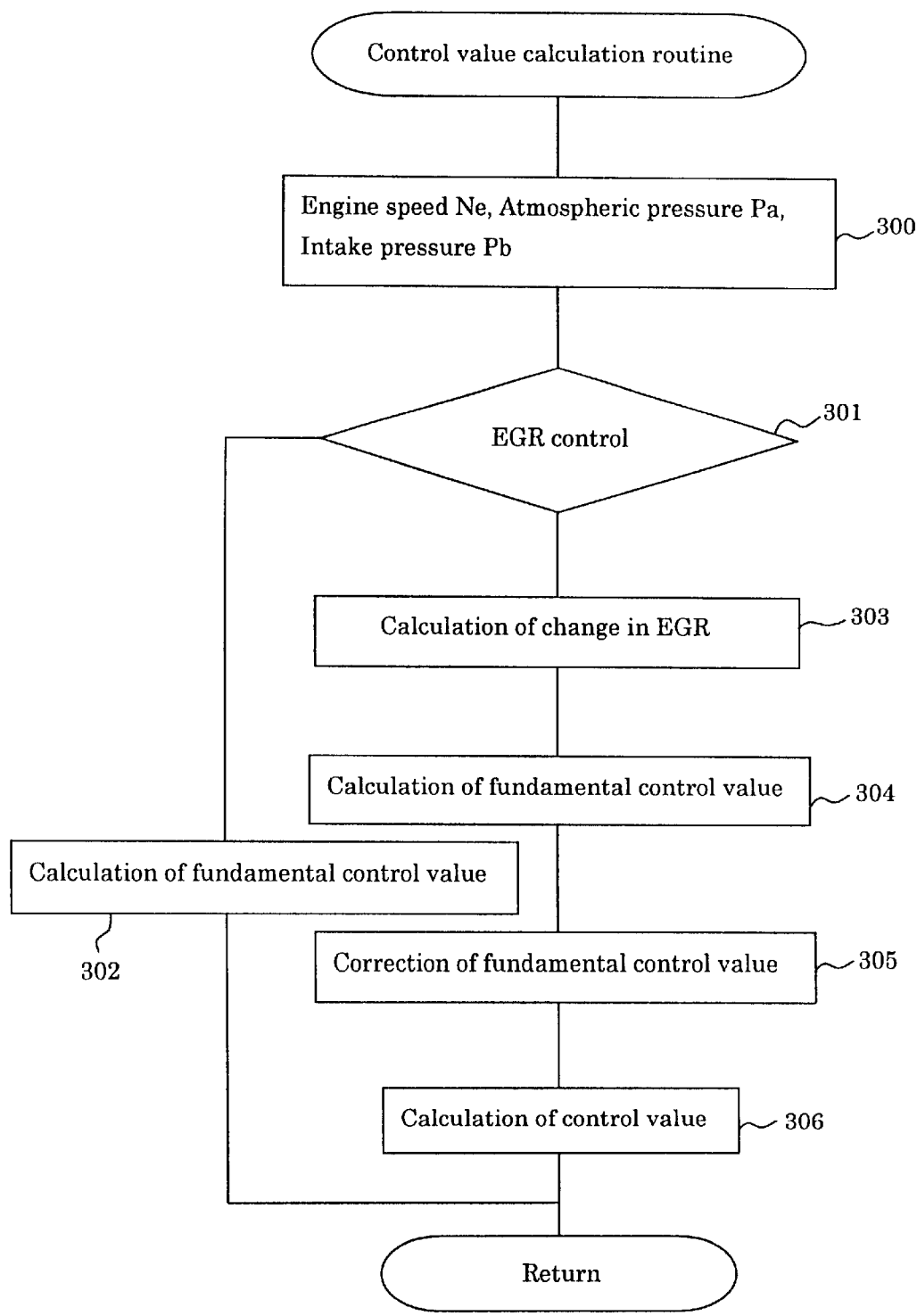
FIG. 3 is a flowchart to explain the operation of the electronic control device of the internal combustion engine according to Embodiment 1 of the invention.
Figure 4:
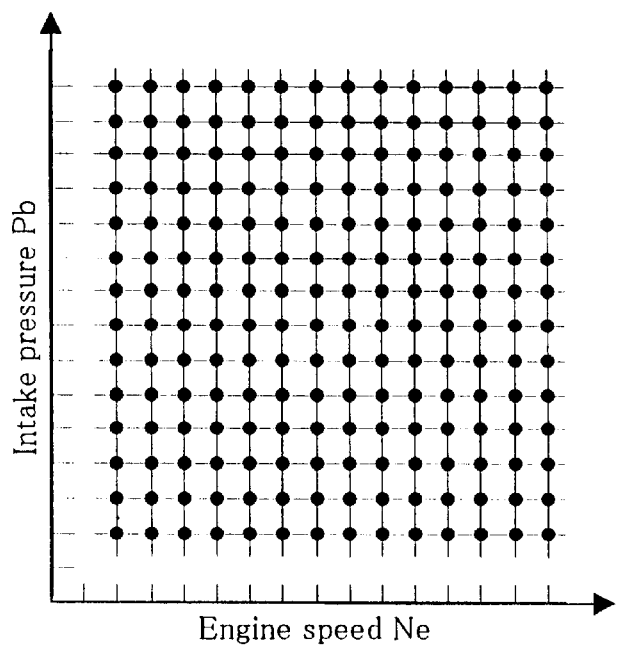
FIG. 4 is a diagram showing a control map on the basis of the electronic control device of the internal combustion engine according to Embodiment 1 of the invention.
Figure 5:
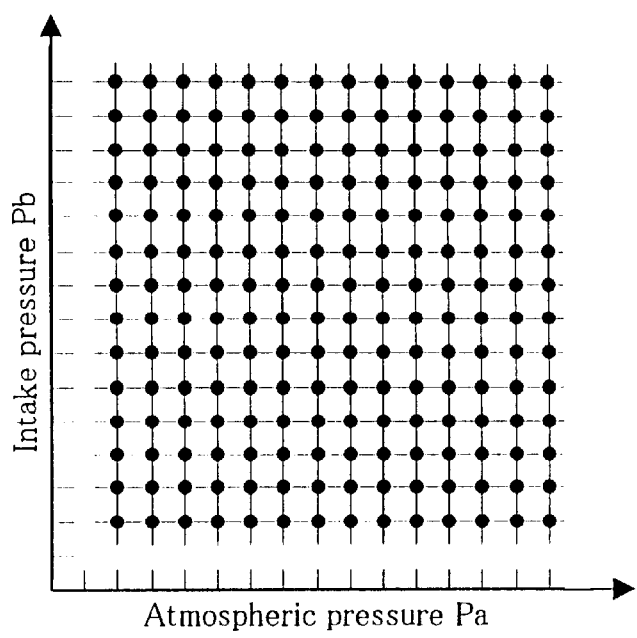
FIG. 5 is a diagram showing a control map on the basis of the electronic control device of the internal combustion engine according to Embodiment 1 of the invention.

FIGS. 1 to 5 are to explain an electronic control device of an internal combustion engine according to Embodiment 1 of the present invention. FIG. 1 is a block diagram showing functions of control means, and FIG. 2 is a schematic view of the electronic control device of the internal combustion engine. FIG. 3 is a flowchart showing calculation steps by the control means. FIG. 4 is a control map on the basis of engine speed of the internal combustion engine and intake pressure, and FIG. 5 is a control map on the basis of atmospheric pressure and intake pressure.

Referring to FIG. 2, reference numeral 1 is an internal combustion engine, numeral 2 is an air-cleaner disposed in an intake passage 3 of the internal combustion engine 1, and numeral 4 is a intake temperature sensor disposed in the intake passage 3. Numeral 5 is a throttle valve for controlling an intake amount of the internal combustion engine 1, and numeral 6 is a throttle-opening sensor to detect opening of the throttle valve 5. Numeral 7 is a surge tank for suppressing pulsation of intake pressure of the intake passage 3, and numeral 8 is an intake pressure sensor disposed in the surge tank 7 to detect the intake pressure. Numeral 9 is an exhaust passage of the internal combustion engine 1, and numeral 10 is an air-fuel ratio sensor disposed in the exhaust passage 9 to detect an air-fuel ratio of a mixed gas supplied to the internal combustion engine 1 from concentration of oxygen in exhaust gas. Numeral 11 is a three-way catalytic converter to purify the exhaust gas.

Reference numeral 12 is an EGR apparatus provided with a stepping motor type EGR valve disposed in an exhaust gas circulation passage 13 connecting the exhaust passage 9 and the surge tank 7 to open and close the fluid passage between the exhaust passage 9 and the surge tank 7. The EGR apparatus 12 controls a recirculation amount of exhaust gas through the valve opening thereof. Numeral 14 is a crank angle sensor to detect a turning angle and an engine speed of a crank shaft of the internal combustion engine 1, and numeral 15 is a water temperature sensor to detect temperature of cooling water of the internal combustion engine 1. Numeral 16 is control means in which signals from the mentioned various sensors are inputted to an input port 17, and a calculated output from an output port 18 thereof is supplied to the EGR apparatus 12, an ignition coil 19 and a fuel injection valve 20, as described later.

FIG. 1 shows a scheme of function served by the control means 16, and in which reference numeral 21 indicates operating condition detector means for detecting operating condition of the internal combustion engine 1. The operating condition detector means 21 comprising engine speed detector means 22 depending on an input from the crank angle sensor 14 and an intake pressure detector means 23 depending on an input from the intake pressure sensor 8. Numeral 24 is exhaust gas recirculation amount control means for calculating a recirculation amount of exhaust gas by inputting the operating condition from the operating condition detector means 21, and controlling the EGR apparatus 12 on the basis of a calculated result.

Numeral 25 is atmospheric pressure detector means for detecting atmospheric pressure on the basis of input from the atmospheric sensor not shown. Otherwise, the atmospheric pressure detector means 25 stores therein output of the intake pressure sensor 8 in the suspended state of the internal combustion engine 1, or detects the output using a value obtained by adding a predetermined correcting value to the output value of the intake pressure sensor 8 when the opening of the throttle valve 5 and the engine speed of the internal combustion engine 1 are not less than a reference value.

Numeral 26 is a first fundamental control value calculating means for calculating a fundamental control value for the internal combustion engine 1 on the basis of a result detected by the operating condition detector means 21 in the suspended state of the EGR apparatus 12.

Numeral 27 is exhaust gas recirculation change calculating means for calculating a change in the recirculation amount of exhaust gas at the time of change in atmospheric pressure. The change is calculated in the form of a rate of change thereof to the recirculation amount of exhaust gas under the standard atmospheric pressure on the basis of the result detected by the operating condition detector means 21 in the operated state of the EGR apparatus 12.

Numeral 28 is second fundamental control value correction means for calculating a correcting value to the second fundamental control value calculating means described later. The correcting value is calculated on the basis of the rate of change in the recirculation amount of exhaust gas according to a result calculated by the exhaust gas recirculation change calculating means 27.

Numeral 29 is a second fundamental control value calculating means for calculating the fundamental control value for the internal combustion engine 1 on the basis of the result detected by the operating condition detector means 21 in the operated state of the EGR apparatus 12. Further, the second fundamental control value calculating means 29 corrects the fundamental control value calculated by the correcting value obtained from the second fundamental control value correction means 28. That is, the fundamental control value calculated by the correcting value based on the rate of change in the recirculation amount of exhaust gas at the time of change in atmospheric pressure is further corrected).

Reference numeral 30 is control value calculating means for correcting the fundamental control value calculated by the first fundamental control value calculating means 26 or the second fundamental control value calculating means 29 with other parameter. That is, the fundamental control value is further corrected by means of a physical value indicating the state of the internal combustion engine such as temperature of the internal combustion engine, whereby a control value of the internal combustion engine 1 is finally determined.

The operation of the electronic control device of the internal combustion engine in this Embodiment 1 of the invention is hereinafter described with reference to the flowchart in FIG. 3.

Referring to the drawing, first in Step 300, an engine speed Ne of the internal combustion engine 1, an atmospheric pressure Pa and an intake pressure Pb are read in. Subsequently in Step 301, it is judged by another step not shown whether or not the EGR apparatus 12 should be operated. Further an EGR opening Eo is set by the engine speed Ne of the internal combustion engine 1 and the intake pressure Pb at the time of implementing the control of the EGR apparatus. A value of the EGR opening Eo is stored at the position where a related lattice point is located on the control map in the form shown in FIG. 4 stored in the control means 16.

In Step 301, if it is judged the EGR apparatus 12 should not be operated, the operation proceeds to Step 302 in which fundamental control values of a corrected fuel injection value Pw1 and an ignition timing Sa1 are calculated by the first fundamental control value calculating means 26. In the same manner as in the mentioned EGR opening Eo, These values are stored at the position where a lattice point of the engine speed of the internal combustion engine and the intake pressure is located on the control map in the form shown in FIG. 4. Then, the operation proceeds to Step 306 in which the control value calculating means 30 conducts a correction using the physical value indicating a state of the internal combustion engine such as temperature of the internal combustion engine 1. Thus, final values of the corrected injection value Pw and the ignition timing Sa are calculated.

On the other hand, In Step 301, if it is judged that the EGR apparatus 12 should be operated, the operation proceeds to Step 303. In Steps 303 and 304, an amount of change in EGR is calculated, and then fundamental values of a corrected injection value Pw2 and an ignition timing Sa2 at the time of implementing the EGR control are calculated. This calculation process is conducted as follows. At the time of implementing the control of the EGR apparatus, there exist a partial pressure occupied by fresh air and that occupied by recirculated exhaust gas in the intake pressure. A ratio Mp of these partial pressures occupied respectively by the fresh air and recirculated gas is stored at the position where the lattice point is located on the control map as shown in FIG. 4 is the same manner as the mentioned EGR opening Eo, so that the corrected injection value Pw1 of the amount of fuel injection is corrected to derive a corrected injection value Pw2 by the following expression.

$$Pw2 = Pw1 \times Mp \tag{1}$$

The ignition timing Sa2 under the state of implementing the EGR control may be different from that under the state of suspending the EGR control. Therefore, under the implementation of the EGR control, either providing another map different from the ignition timing Sa1 or calculating the ignition timing Sa2 according to the following expression by preparing a ignition timing correcting value Sak on the control map in the form as shown in FIG. 4, is selectively employed.

$$Sa2 = Sa1 \times Sak \tag{2},$$

Note that these maps comply with the atmospheric pressure when it is the standard atmospheric pressure (1,013 hpa).

In this manner, in case that all of the EGR opening, EGR partial pressure ratio, corrected injection value and ignition timing are stored on the control map in the form shown in FIG. 4, a following phenomenon occurs at a place of high altitudes where atmospheric pressure is low. That is, in case of setting the EGR opening is based on the engine speed of the internal combustion engine and the intake pressure, a back pressure becomes low according to the reduction in atmospheric pressure at such place of high altitudes. Accordingly, an EGR amount is more reduced at higher altitudes if setting of the EGR opening is the same as that under the standard atmospheric pressure. As a result, an error takes place in the EGR partial pressure ratio, and an inconsistency between the amount of fuel injection and the ignition timing is brought about.

For this reason, the fundamental control value is corrected in Step 305 as follows. That is, a change ratio Ed of the EGR amount according to atmospheric pressure is stored on a control map in the form shown in FIG. 5, i.e., the map having the axes of the atmospheric pressure Pa and the intake pressure Pb. Then the change ratio Ed of the EGR amount at high altitudes is calculated from the atmospheric pressure and the intake pressure. Further calculating as shown in the following expression, it is possible to obtain a corrected injection value Pw2s complying with the actual EGR amount.

$$Pw2s = Pw1 \times \{1-(1-Mp) \times Ed\} \quad (3)$$

Appropriate ignition timing also differs depending on the actual EGR amount. However, by interpolating the ignition timing depending upon the implementation or suspension of the EGR control on the basis of the change ratio Ed of the EGR amount as shown in the following expression, an appropriate ignition timing Sa2s can be obtained by the following calculation:

$$Sa2s = Sa1 \times (1-Ed) + Sa2 \times Ed \quad (4)$$

The corrected injection value Pw2s and ignition timing Sa2s obtained in the foregoing manner are then subject to the correction by another parameter of the internal combustion engine 1 using the control value calculating means 30 in Step 306 in the same manner as in the suspension of the EGR apparatus, whereby the final values of a corrected injection value Pw and ignition timing Sa are obtained.

The reason why the map consisting of the atmospheric pressure and the intake pressure shown in FIG. 5 is employed herein to serve as the map for storing the change ratio Ed of the EGR amount is hereinafter described. That is, the EGR amount introduced through the EGR apparatus is determined by the EGR opening Eo and the differential pressure between the back pressure Pe and the intake pressure Pb. In the control method according to the invention, in case that the engine speed Ne of the internal combustion engine 1 and the intake pressure Pb remain unchanged, the EGR opening Eo under the standard atmospheric pressure and that at high altitudes remain unchanged and the intake pressure also remains unchanged, however, only the back pressure Pe largely depending on the atmospheric pressure does change.

For this reason, it is possible to express the ratio between the EGR amount under the standard atmospheric pressure and that at high altitudes by using the back pressure Pe (≈atmospheric pressure Pa) and the intake pressure Pb according to the known energy equation assuming that the flow running through the EGR apparatus 12 is isentropic. From this relation, the map representing the change ratio Ed of the EGR amount can be calculated on the desk. As a result, it is possible to easily conform the change ratio Ed of the EGR amount to the change of the EGR amount under the change of atmospheric pressure utilizing the mentioned map.

What is claimed is:

1. An electronic control device for an internal combustion engine comprising:

atmospheric pressure detector means for detecting an atmospheric pressure;

operating condition detector means for detecting an operating condition of said internal combustion engine from engine speed and intake pressure of the internal combustion engine;

exhaust gas recirculation amount control means for controlling a recirculation amount of exhaust gas on the basis of a result detected by said operating condition detector means;

first fundamental control value calculating means for calculating a fundamental control value of said internal combustion engine on the basis of the result detected by said operating condition detector means in the suspended state of exhaust gas recirculation;

second fundamental control value calculating means for calculating a fundamental control value of said internal combustion engine on the basis of the result detected by said operating condition detector means in the operated state of exhaust gas recirculation;

control value calculating means for correcting a result calculated by said first fundamental control value calculating means or a result calculated by said second fundamental control value calculating means on the basis of a physical value representing a state of said internal combustion engine;

exhaust gas recirculation change calculating means for calculating a change in recirculation amount of exhaust gas at the time of change in atmospheric pressure in the form of a rate of change to the recirculation amount of exhaust gas under the standard atmospheric pressure on the basis of the result detected by said operating condition detector means and the result detected by said atmospheric pressure detector means in the operated state of exhaust gas recirculation; and correction means for correcting the fundamental control value calculated by said second fundamental control value calculating means on the basis of the rate of change to the recirculation amount of exhaust gas calculated by said exhaust gas recirculation change value calculating means.

2. The electronic control device according to claim 1, wherein the fundamental control value is an amount of fuel injection of a fuel injection device.

3. The electronic control device according to claim 1, wherein the fundamental control value is a control value for ignition timing.

4. The electronic control device according to claim 1, wherein the ratio of change of the recirculation amount of exhaust gas is calculated by the exhaust gas recirculation change calculating means as a function of atmospheric pressure and intake pressure.

5. A method for controlling an internal combustion engine in which an operating condition of an internal combustion engine is detected on the basis of engine speed of the internal combustion engine and intake pressure, a recirculation amount of exhaust gas is controlled on the basis of the detected result thereof, and a fundamental control value of the internal combustion engine is corrected in compliance with said operating condition;

the method comprising:
- a step of calculating the fundamental control value of said internal combustion engine in compliance with the operating condition in the operated state of exhaust gas recirculation;
- a step of calculating a change in recirculation amount of exhaust gas at the time of change in atmospheric pressure in the form of a rate of change thereof to the recirculation amount of exhaust gas under the standard atmospheric pressure in the operated state of exhaust gas recirculation; and
- a step of correcting said fundamental control value on the basis of said rate of change.

6. The method for controlling an internal combustion engine according to claim 5, wherein in said step of calculating the fundamental control value, amount of fuel injection through a fuel injection device or an adjusting value of ignition timing is calculated as the fundamental control value.

* * * * *